United States Patent
Zhang et al.

(10) Patent No.: US 11,636,332 B2
(45) Date of Patent: Apr. 25, 2023

(54) SYSTEMS AND METHODS FOR DEFENSE AGAINST ADVERSARIAL ATTACKS USING FEATURE SCATTERING-BASED ADVERSARIAL TRAINING

(71) Applicant: Baidu USA, LLC, Sunnyvale, CA (US)

(72) Inventors: Haichao Zhang, Sunnyvale, CA (US); Jianyu Wang, Santa Clara, CA (US)

(73) Assignee: Baidu USA LLC, Sunnyvale, CA (US)

( * ) Notice: Subject to any disclaimer, the term of this patent is extended or adjusted under 35 U.S.C. 154(b) by 914 days.

(21) Appl. No.: 16/506,519

(22) Filed: Jul. 9, 2019

(65) Prior Publication Data

US 2021/0012188 A1    Jan. 14, 2021

(51) Int. Cl.
- *G06N 3/08* (2006.01)
- *G06F 21/57* (2013.01)
- *G06K 9/62* (2022.01)

(52) U.S. Cl.
CPC ............. *G06N 3/08* (2013.01); *G06F 21/57* (2013.01); *G06K 9/627* (2013.01); *G06K 9/6256* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 2019/0238568 A1* | 8/2019 | Goswami | G06N 20/10 |
| 2020/0265219 A1* | 8/2020 | Liu | G06N 20/00 |

OTHER PUBLICATIONS

Arjovsky et al.,"Wasserstein generative adversarial networks," In Proceedings of the 34th International Conference on Machine Learning, 2017. (10pgs).

Athalye et al.,"Obfuscated gradients give a false sense of security: Circumventing defenses to adversarial examples," arXiv preprint arXiv:1802.00420, 2018. (12pgs).

J. F. Bard, "Practical Bilevel Optimization: Algorithms and Applications," Springer Publishing Company, Incorporated, 1st edition, 2010. (7pgs).

Biggio et al.,"Evasion attacks against machine learning at test time," arXiv preprint arXiv:1708.06131, 2017. (16pgs).

Biggio et al.,"Wild patterns: Ten years after the rise of adversarial machine learning," arXiv preprint arXiv:1712.03141, 2018. (17pgs).

(Continued)

*Primary Examiner* — Leon Viet Q Nguyen
(74) *Attorney, Agent, or Firm* — North Weber & Baugh LLP

(57) ABSTRACT

Described herein are embodiments for a feature-scattering-based adversarial training approach for improving model robustness against adversarial attacks. Conventional adversarial training approaches leverage a supervised scheme, either targeted or non-targeted in generating attacks for training, which typically suffer from issues such as label leaking as noted in recent works. Embodiments of the disclosed approach generate adversarial images for training through feature scattering in the latent space, which is unsupervised in nature and avoids label leaking. More importantly, the presented approaches generate perturbed images in a collaborative fashion, taking the inter-sample relationships into consideration. Extensive experiments on different datasets compared with state-of-the-art approaches demonstrate the effectiveness of the presented embodiments.

20 Claims, 10 Drawing Sheets

(56) References Cited

OTHER PUBLICATIONS

Brendel et al., "Decision-based adversarial attacks: Reliable attacks against black-box machine learning models," arXiv preprint arXiv:1712.04248, 2018. (12pgs).
Brown et al., "Adversarial patch," arXiv preprint arXiv:1712.09665, 2018. (6pgs).
Carlini et al., "Towards evaluating the robustness of neural networks," arXiv preprint arXiv:1608.04644, 2017. (19pgs).
Carlini et al., "Audio adversarial examples: Targeted attacks on speech-to-text," arXiv preprint arXiv:1801.01944, 2018. (7pgs).
Chen et al., "Adversarial text generation via feature-mover's distance," arXiv preprint arXiv:1809.06297, 2018. (17pgs).
Cisse et al., "Houdini: Fooling deep structured prediction models," arXiv preprint arXiv:1707.05373, 2017. (12pgs).
M. Cuturi, "Sinkhorn distances: Lightspeed computation of optimal transport," arXiv preprint arXiv:1306.0895, 2013. (13pgs).
Dempe et al., "Bilevel Programming Problems: Theory, Algorithms and Applications to Energy Networks," Springer Publishing Company, Incorporated, 2015. (1pg).
Draxler et al., "Essentially no barriers in neural network energy landscape," arXiv preprint arXiv:1803.00885, 2019. (12pgs).
Dubey et al., "Defense against adversarial images using web-scale nearest-neighbor search," arXiv preprint arXiv:1903.01612, 2019. (14pgs).
Etmann, "On the connection between adversarial robustness and saliency map interpretability," arXiv preprint arXiv:1905.04172, 2019. (12pgs).
Eykholt et al., "Physical adversarial examples for object detectors," arXiv preprint arXiv:1807.07769, 2018. (10pgs).
Fawzi et al., "Empirical study of the topology and geometry of deep networks," In IEEE Conference on Computer Vision & Pattern Recognition, 2018. (9pgs).
Genevay et al., "GAN and VAE from an optimal transport point of view," arXiv preprint arXiv:1706.01807, 2017. (6pgs).
Genevay et al., "Learning generative models with sinkhorn divergences," arXiv preprint arXiv:1706.00292, 2017. (12pgs).
Goldberger et al., "Neighbourhood components analysis," In Advances in Neural Information Processing Systems, 2005. (8pgs).
Goodfellow et al., "Generative adversarial nets," arXiv preprint arXiv:1406.2661, 2014. (9pgs).
Goodfellow et al., "Explaining and harnessing adversarial examples," arXiv preprint arXiv:1412.6572, 2015. (11 pgs).
Guo et al., "Countering adversarial images using input transformations," arXiv preprint arXiv:1711.00117, 2018. (12pgs).
Hinton et al., "Reducing the dimensionality of data with neural networks," Science, 313(5786):504-507, 2006. (3 pgs).
Ilyas et al., "The robust manifold defense: Adversarial training using generative models," arXiv preprint arXiv:1712.09196, 2019. (17pgs).
Ilyas et al., "Adversarial examples are not bugs, they are features," arXiv preprint arXiv:1905.02175, 2019. (36pgs).
Jacobsen et al., "Excessive invariance causes adversarial vulnerability," arXiv preprint arXiv:1811.00401, 2019. (17pgs).
Kannan et al., "Adversarial logit pairing," arXiv preprint arXiv:1803.06373, 2018. (10pgs).
A. Krizhevsky, "Learning multiple layers of features from tiny images," Technical report, 2009. (60 pgs).
Kurakin et al., "Adversarial machine learning at scale," arXiv preprint arXiv:1611.01236, 2017. (17pgs).
Liao et al., "Defense against adversarial attacks using high-level representation guided denoiser," arXiv preprint arXiv:1712.02976, 2018. (10pgs).
Lindqvist et al., "AutoGAN: Robust classifier against adversarial attacks," arXiv preprint arXiv:1812.03405, 2018. (12pgs).
Liu et al., "Towards robust neural networks via random self-ensemble," arXiv preprint arXiv:1712.00673, 2018. (17pgs).
Madry et al., "Towards deep learning models resistant to adversarial attacks," arXiv preprint arXiv:1706.06083, 2017. (27pgs).
Meng et al., "MagNet: a two-pronged defense against adversarial examples," arXiv preprint arXiv:1705.09064, 2017. (13pgs).
Metzen et al., "On detecting adversarial perturbations," arXiv preprint arXiv:1702.04267, 2017. (12pgs).
Miyato et al., "Virtual adversarial training: a regularization method for supervised and semi-supervised learning," arXiv preprint arXiv:1704.03976, 2018. (16pgs).
Moosavi-Dezfooli et al., "Universal adversarial perturbations," arXiv preprint arXiv: 1610.08401, 2017. (11 pgs).
Moosavi-Dezfooli et al., "Deepfool: a simple and accurate method to fool deep neural networks," arXiv preprint arXiv:1511.04599, 2016. (9pgs).
Netzer et al., "Reading digits in natural images with unsupervised feature learning," NIPS Workshop on Deep Learning and Unsupervised Feature Learning, 2011. (9pgs).
Papernot et al., "The limitations of deep learning in adversarial settings," arXiv preprint arXiv:1511.07528, 2015. (16pgs).
Park et al., "Representing and Learning High Dimensional Data with the Optimal TransportMap from a Probabilistic Viewpoint,": In IEEE Conf on Computer Vision & Pattern Recognition, 2018. (9pgs).
Peyré et al., "Computational optimal transport," arXiv preprint arXiv:1803.00567, 2019. (5pgs).
Prakash et al., "Deflecting adversarial attacks with pixel deflection," arXiv preprint arXiv:1801.08926, 2018. (17 pgs).
Rolet et al., "Fast dictionary learning with a smoothed Wasserstein loss," In International Conference on Artificial Intelligence and Statistics, 2016. (10pgs).
Salakhutdinov et al., "Learning a nonlinear embedding by preserving class neighbourhood structure," In Intr Conf on Artificial Intelligence and Statistics, 2007. (8pgs).
Salimans et al., "Improving GANs using optimal transport," arXiv preprint arXiv:1803.05573, 2018. (13pgs).
Samangouei et al., "Defense-GAN: Protecting classifiers against adversarial attacks using generative models," arXiv preprint arXiv:1805.06605, 2018. (17pgs).
Saul et al., "Think globally, fit locally: Unsupervised learning of low dimensional manifolds," Journal of Machine Learning Research, 4:119-155, 2003. (37pgs).
Schmidt et al., "Adversarially robust generalization requires more data," arXiv preprint arXiv:1804.11285, 2018. (39 pgs).
Song et al., "Pixeldefend: Leveraging generative models to understand and defend against adversarial examples," arXiv preprint arXiv:1710.10766, 2017. (20 pgs).
Su et al., "One pixel attack for fooling deep neural networks," arXiv preprint arXiv:1710.08864, 2019. (15pgs).
Szegedy et al., "Intriguing properties of neural networks," arXiv preprint arXiv:1312.6199, 2014. (10pgs).
Tanay et al., "A boundary tilting persepective on the phenomenon of adversarial examples," arXiv preprint arXiv:1608.07690, 2016. (20 pgs).
Tolstikhin et al., "Wasserstein auto-encoders," arXiv preprint arXiv:1711.01558, 2018. (18pgs).
Tramèr et al., "Ensemble adversarial training: Attacks and defenses," arXiv preprint arXiv:1705.07204, 2018. (20pgs).
Tramèr et al., "The space of transferable adversarial examples," arXiv preprint arXiv:1704.03453, 2017. (15pgs).
C. Villani, "Optimal transport, old and new," Springer, 2008. (5pgs).
J. Wang, "Bilateral adversarial training: Towards fast training of more robust models against adversarial attacks," arXiv preprint arXiv: 1811.10716, 2018. (11 pgs).
D. Warde-Farley, "l1 adversarial perturbations of deep neural networks," 2016. (34 pgs).
Xiao et al., "Generating adversarial examples with adversarial networks," arXiv preprint arXiv:1801.02610, 2019. (8pgs).
Xie et al., "Mitigating adversarial effects through randomization," arXiv preprint arXiv:1711.01991, 2018. (16pgs).
Xie et al., "Adversarial examples for semantic segmentation and object detection," arXiv preprint arXiv:1703.08603, 2017. (12pgs).
Xie et al., "Feature denoising for improving adversarial robustness," arXiv preprint arXiv:1812.03411, 2019. (9 pgs).
Xie et al., "A fast proximal point method for Wasserstein distance," arXiv preprint arXiv:1802.04307, 2019. (29pgs).
Yan et al., "Deep defense: Training dnns with improved adversarial robustness," arXiv preprint arXiv:1803.00404, 2018. (16 pgs).

(56) References Cited

OTHER PUBLICATIONS

Zagoruyko et al.,"Wide residual networks," arXiv preprint arXiv:1605.07146, 2017. (15pgs).
Zhang et al.,"The limitations of adversarial training and the blind-spot attack," arXiv preprint arXiv:1901.04684, 2019. (16pgs).
Zhang et al.,"mixup: Beyond empirical risk minimization," arXiv preprint arXiv:1710.09412, 2018. (13pgs).

* cited by examiner

300

305

600

SYSTEMS AND METHODS FOR DEFENSE AGAINST ADVERSARIAL ATTACKS USING FEATURE SCATTERING-BASED ADVERSARIAL TRAINING

BACKGROUND

A. Technical Field

The present disclosure relates generally to systems and methods for training image model. More particularly, the present disclosure relates to systems and methods for training image model against adversarial attacks to improve model robustness.

B. Background

While breakthroughs have been made in many fields such as image classification leveraging deep neural networks, these models could be easily fooled by the so call adversarial examples. In terms of the image classification, an adversarial example for a natural image is a modified version which is visually indistinguishable from the original but causes the classifier to produce a different label prediction. Adversarial examples have been shown to be ubiquitous beyond classification, ranging from object detection to speech recognition.

Encouraging progresses been made towards improving model robustness against adversarial examples. Among them, adversarial training is one of the most popular technique, which conducts model training using the adversarially perturbed images in place of the original ones. However, several challenges remain to be addressed. Firstly, some adverse effects such as label leaking is still an issue hindering adversarial training. Currently available remedies either increase the number of iterations for generating the attacks or use classes other than the ground-truth for attack generation. Increasing the attack iterations will increase the training time proportionally while using non-ground-truth targeted approach cannot fully eliminate label leaking. Secondly, previous approaches for both standard and adversarial training treat each training sample individually and in isolation with respect to other samples. Manipulating each sample individually this way neglects the inter-sample relationships and does not fully leverage the potential for attacking and defending, thus limiting the performance.

Accordingly, what is needed are systems and methods for systems and methods to address the above issues for training image model against adversarial attacks and improving model robustness.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
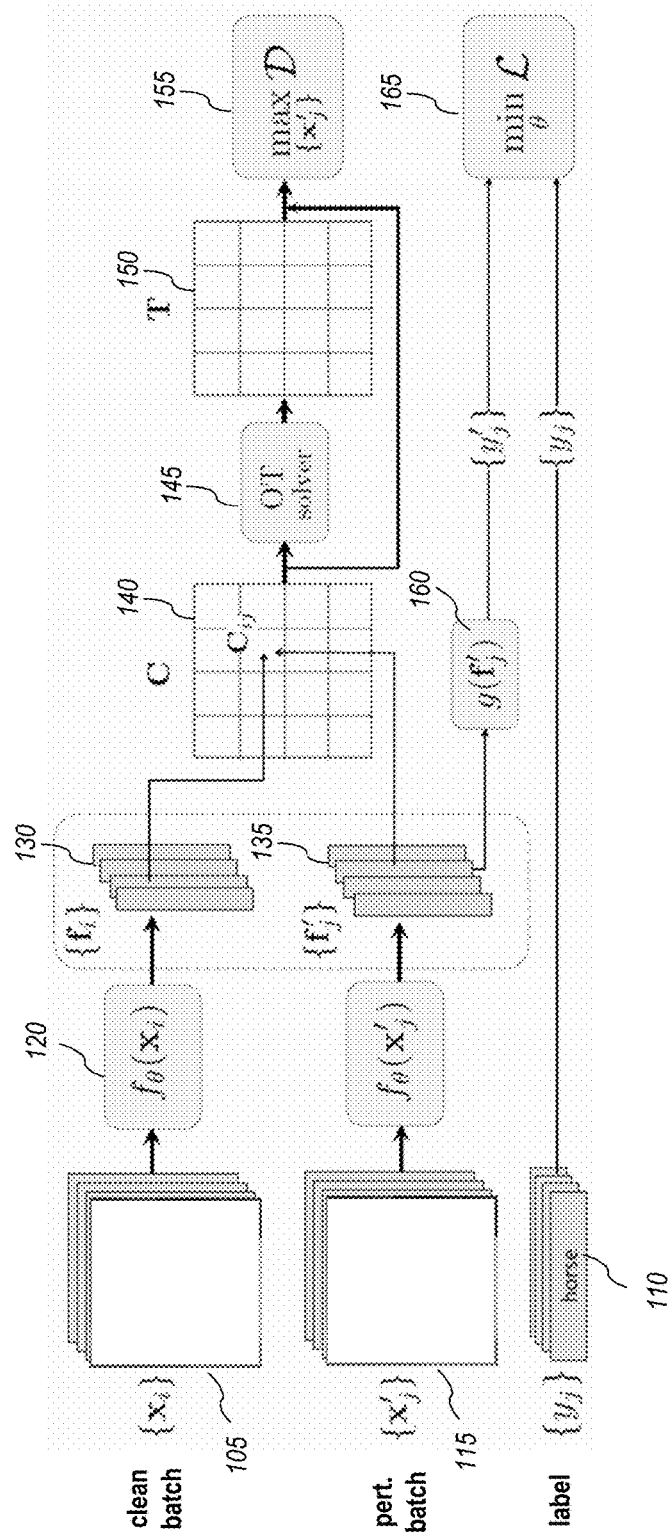
FIG. 1 depicts a feature-scattering-based adversarial training pipeline, according to embodiments of the present disclosure.

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

While breakthroughs have been made in many fields such as image classification leveraging deep neural networks, these models could be easily fooled by the so call adversarial examples. In terms of the image classification, an adversarial example for a natural image is a modified version which is visually indistinguishable from the original but causes the classifier to produce a different label prediction Adversarial examples have been shown to be ubiquitous beyond classification, ranging from object detection to speech recognition.

Encouraging progresses been made towards improving model robustness against adversarial examples. Among them, adversarial training is one of the most popular technique, which conducts model training using the adversarially perturbed images in place of the original ones. However, several challenges remain to be addressed. Firstly, some adverse effects such as label leaking is still an issue hindering adversarial training. Currently available remedies either increase the number of iterations for generating the attacks or use classes other than the ground-truth for attack generation. Increasing the attack iterations will increase the training time proportionally while using non-ground-truth targeted approach cannot fully eliminate label leaking. Secondly, previous approaches for both standard and adversarial training treat each training sample individually and in isolation with respect to other samples. Manipulating each sample individually this way neglects the inter-sample relationships and does not fully leverage the potential for attacking and defending, thus limiting the performance.

Manifold and neighborhood structure have been proven to be effective in capturing the inter-sample relationships. Natural images live on a low-dimensional manifold, with the training and testing images as samples from it. Modern classifiers are over-complete in terms of parameterizations and different local minima have been shown to be equally effective under the clean image setting. However, different solution points might leverage different set of features for prediction. For learning a well-performing classifier on natural images, it suffices to simply adjust the classification boundary to intersect with this manifold at locations with good separation between classes on training data, as the test data will largely reside on the same manifold. However, the classification boundary that extends beyond the manifold is less constrained, contributing to the existence of adversarial examples. For examples, it has been pointed out that some clean trained models focus on some discriminative but less robust features, thus are vulnerable to adversarial attacks. Therefore, the conventional supervised attack that tries to move feature points towards this decision boundary is likely to disregard the original data manifold structure. When the decision boundary lies close to the manifold for its out of manifold part, adversarial perturbations lead to a tilting effect on the data manifold; at places where the classification boundary is far from the manifold for its out of manifold part, the adversarial perturbations will move the points towards the decision boundary, effectively shrinking the data manifold. As the adversarial examples reside in a large, contiguous region and a significant portion of the adversarial subspaces is shared, pure label-guided adversarial examples will clutter at least in the shared adversarial subspace. In summary, while these effects encourage the model to focus more around the current decision boundary, they also make the effective data manifold for training deviate from the original one, potentially hindering the performance.

Figure 2:
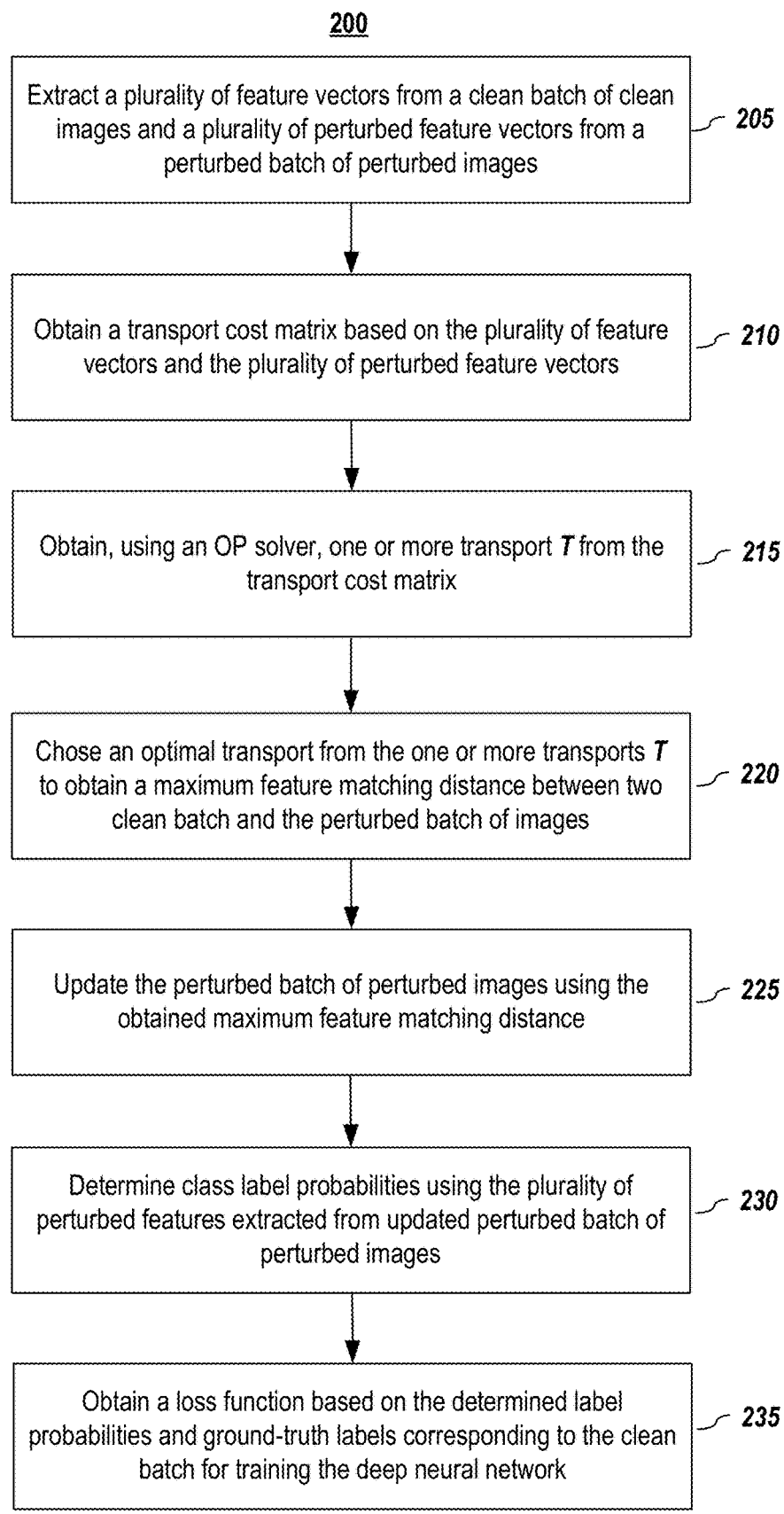
FIG. 2 depicts a process for feature-scattering-based adversarial training, according to embodiments of the present disclosure.

Motived by these observations, the present patent document shifts the previous focus on the decision boundary to the inter-sample structure. Embodiments of disclosed feature-scattering approaches may be intuitively understood as generating adversarial examples by perturbing the local neighborhood structure in an unsupervised fashion and then performing model training with the generated adversarial images. FIG. 1 shows an overall framework 100 for feature-scattering-based adversarial training and FIG. 2 depicts a process for feature-scattering-based adversarial training with the framework 100, according to embodiments of the present disclosure. The adversarial perturbations are generated collectively by feature scattering, i.e., maximizing the feature matching distance between the clean samples $\{x_i\}$ and the perturbed samples $\{x'_j\}$. Model parameters $\theta$ are updated by minimizing the cross-entropy loss using the perturbed images $\{x'_j\}$ as the training samples.

Referring to FIGS. 1 and 2, a feature extractor $f_\theta(\cdot)$ 120 extract (205) a plurality of feature vectors $\{f_i\}$ 130 from a clean batch of clean images $\{x_i\}$ 105 and a plurality of perturbed feature vectors $\{f'_j\}$ 135 from a perturbed batch of perturbed images $\{x'_j\}$ 115. In one or more embodiments, $f_\theta(\cdot)$ is implemented as an image mode, e.g. a deep neural network up to a softmax layer. In one or more embodiments, the perturbed batch of perturbed images $x'_j$ may be initially obtained by applying initial perturbation to the clean batch of images. In one or more embodiments, the initial perturbation to the clean batch is done by applying random perturbation to each of the clean images $\{x_i\}$ within $\ell_\infty$-cube $B(x, \in)$ with a center $x_i$ and a radius $\in$. A transport cost matrix C 140 is obtained (210) based on the plurality of feature vectors $\{f_i\}$ 130 and the plurality of perturbed feature vectors $\{f'_j\}$ 135, with an element $C_{ij}$ of the transport cost matrix C defined as the cosine distance (or any other proper distance measure) between image features $x_i$ and $x'_j$. An OT solver 145 is used for obtaining (215) one or more transport matrices T 150 based on the transport cost matrix C. An optimal transport is chosen (220) from the one or more transport matrices T to obtain a maximum value 155 for a feature matching distance $\mathcal{D}$ between two batches of images $\{x_i\}$ and $\{x'_j\}$. The feature matching distance may be obtained by a Frobenius dot-product between the transport matrix T and the transport cost matrix C.

In one or more embodiments, one or more iterative steps may be implemented (not shown in FIG. 1) to update (225) the perturbed batch of perturbed images $x'_j$ using the obtained maximum feature matching distance $\mathcal{D}$, until a predetermined threshold, e.g. iteration number, is reached.

In one or more embodiments, the plurality of perturbed feature vectors $\{f'_j\}$ 135 from updated perturbed batch of perturbed images are used to determine (230) labels in a softmax layer 160 of the deep neural network. A loss function 165 based on the determined labels and ground-truth labels $y_j$ 110 corresponding to the clean batch 105 may be obtained (235) for training the deep neural network with a goal of minimizing the loss function. One or more training epochs may be performed until a predetermined training epoch number is reached and the final model parameters θ the deep neural network are output.

Although the FIGS. 1 and 2 and some disclosed embodiments hereinafter are related to image model, one skilled in the art may understand the feature-scattering-based adversarial training may also be used for other applications, including but not limited to voice recognition, etc. Such variations shall still be within the scope of this invention.

Some contributions of the presented patent document may be summarized as follows:

Embodiments of novel feature-scattering approaches for generating adversarial images are disclosed for adversarial training in a collaborative and unsupervised fashion;

Embodiments of an adversarial training formulation, which deviates from the conventional minimax formulation and falls into a broader category of bilevel optimization, are presented;

Embodiments of the approach are analyzed and compared with several state-of-the-art techniques, with extensive experiments on a number of standard benchmarks. The effectiveness of the approach was verified.

B. Some Related Work

1. Adversarial Attack, Defense and Adversarial Training

Adversarial examples have attracted great attention recently. Some pointed out that CNNs are vulnerable to adversarial examples and proposed an L-BFGS-based algorithm for generating them. A fast gradient sign method (FGSM) for adversarial attack generation has been developed and used in adversarial training. Many variants of attacks have been developed later. In the meantime, many efforts have been devoted to defending against adversarial examples. Recently, some showed that many existing defense methods suffer from a false sense of robustness against adversarial attacks due to gradient masking, and adversarial training is one of the effective defense methods against adversarial attacks. It improves model robustness by solving a minimax problem as:

$$\min_{\theta} [\max_{x' \in S_x} \mathcal{L}(x', y; \theta)] \quad (1)$$

Where the inner maximization essentially generates attacks while the outer minimization corresponds to minimizing the "adversarial loss" induced by the inner attacks. The inner maximization can be solved approximately, using for example a one-step approach such as Fast Gradient Sign Method (FGSM) (I. Goodfellow, et al., Explaining and harnessing adversarial examples, In International Conference on Learning Representations, 2015), or a multi-step projected gradient descent (PGD) method:

$$x^{t+1} = \mathcal{P}_{S_x}(x^t + \alpha \cdot \text{sign}(\nabla_x \mathcal{L}(x^t, y; \theta))) \quad (2)$$

Where $\mathcal{P}_{S_x}$ is a projection operator projecting the input into the feasible region $S_x$. In the PGD approach, the original image x is randomly perturbed to some point $x^0$ within B(x, ∈), the ∈-cube around x, and then goes through several PGD steps with a step size of α as shown in Equation (2).

Label leaking and gradient masking are some well-known issues that hinder the adversarial training. Label leaking occurs when the additive perturbation is highly correlated with the ground-truth label. Therefore, when it is added to the image, the network can directly tell the class label by decoding the additive perturbation without relying on the real content of the image, leading to higher adversarial accuracy than the clean image during training. Gradient masking refers to the effect that the adversarially trained model learns to "improve" robustness by generating less useful gradients for adversarial attacks, which could be by-passed with a substitute model for generating attacks, thus giving a false sense of robustness.

2. Different Distances for Feature and Distribution Matching

Euclidean distance is arguably one of the most commonly used metrics for measuring the distance between a pair of points. When it comes to two sets of points, it is natural to accumulate the individual pairwise distance as a measure of distance between the two sets, given the proper correspondence. Alternatively, each set may be viewed as an empirical distribution and measure the distance between them using Kullback-Leibler (KL) or Jensen-Shannon (JS) divergence. The challenge for learning with KL or JS divergence is that no useful gradient is provided when the two empirical distributions have disjoint supports or have a non-empty intersection contained in a set of measure zero. The optimal transport (OT) distance is an alternative measure of the distance between distributions with advantages over KL and JS in the scenarios mentioned earlier. The OT distance between two probability measures μ and ν may be defined as:

$$\mathcal{D}(\mu, \nu) = \inf_{\gamma \in \Pi(\mu, \nu)} \mathbb{E}_{(x,y) \sim \gamma} c(x, y) \quad (3)$$

Where Π(μ, ν) denotes the set of all joint distributions γ(x, y) with marginals μ(x) and ν(y), and c(x, y) is the cost function (e.g., Euclidean or cosine distance). Intuitively, $\mathcal{D}(\mu, \nu)$ is the minimum cost that y has to transport from μ to ν. It provides a weaker topology than many other measures, which is important for applications where the data typically resides on a low dimensional manifold of the input embedding space (exactly the case for natural images). OT distance has been widely applied to many tasks, such as generative modeling, auto-encoding and dictionary learning.

C. Embodiments for Feature-Scattering-Based Adversarial Training

In this section, in order to improve the adversarial robustness, embodiments of feature-scattering-based adversarial training are disclosed.

1. Embodiments for Feature Matching and Feature Scattering

Figure 3A:
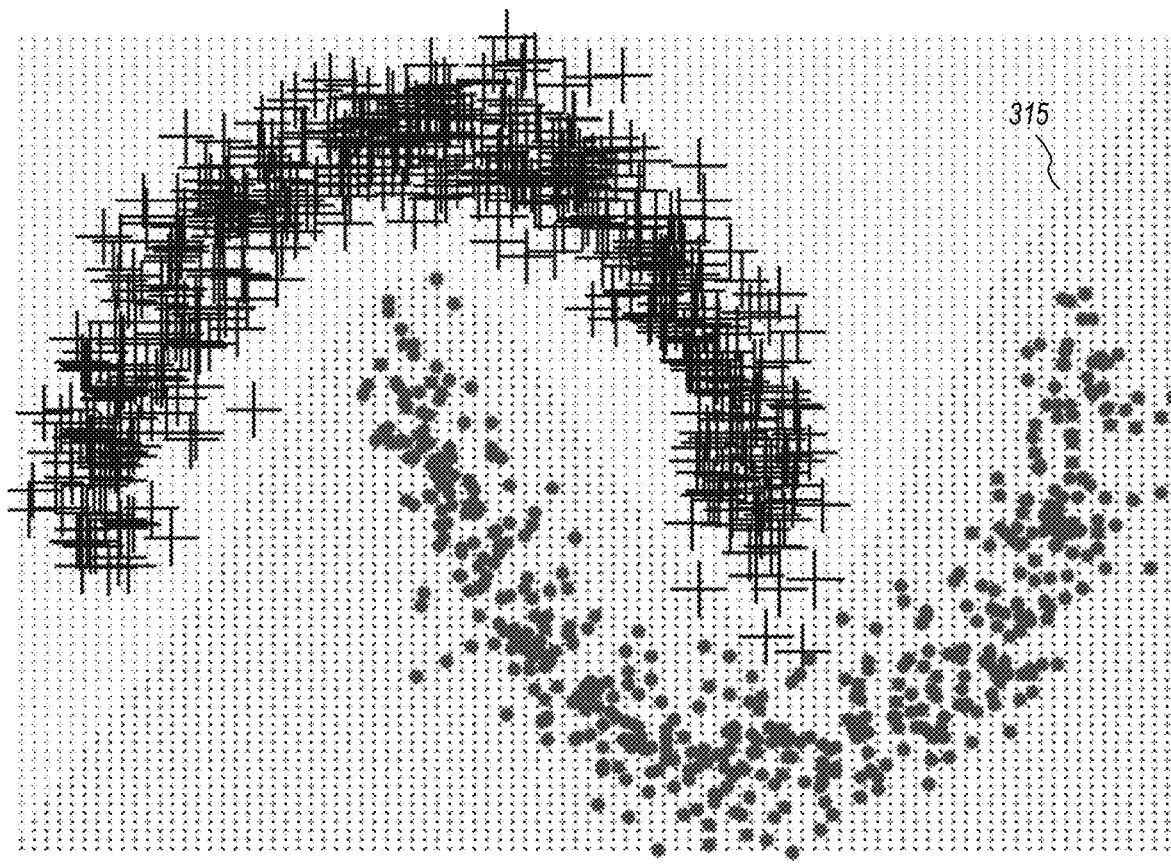
FIG. 3A graphically depicts an example of clean data with decision boundary, according to embodiments of the present disclosure.
Figure 3B:
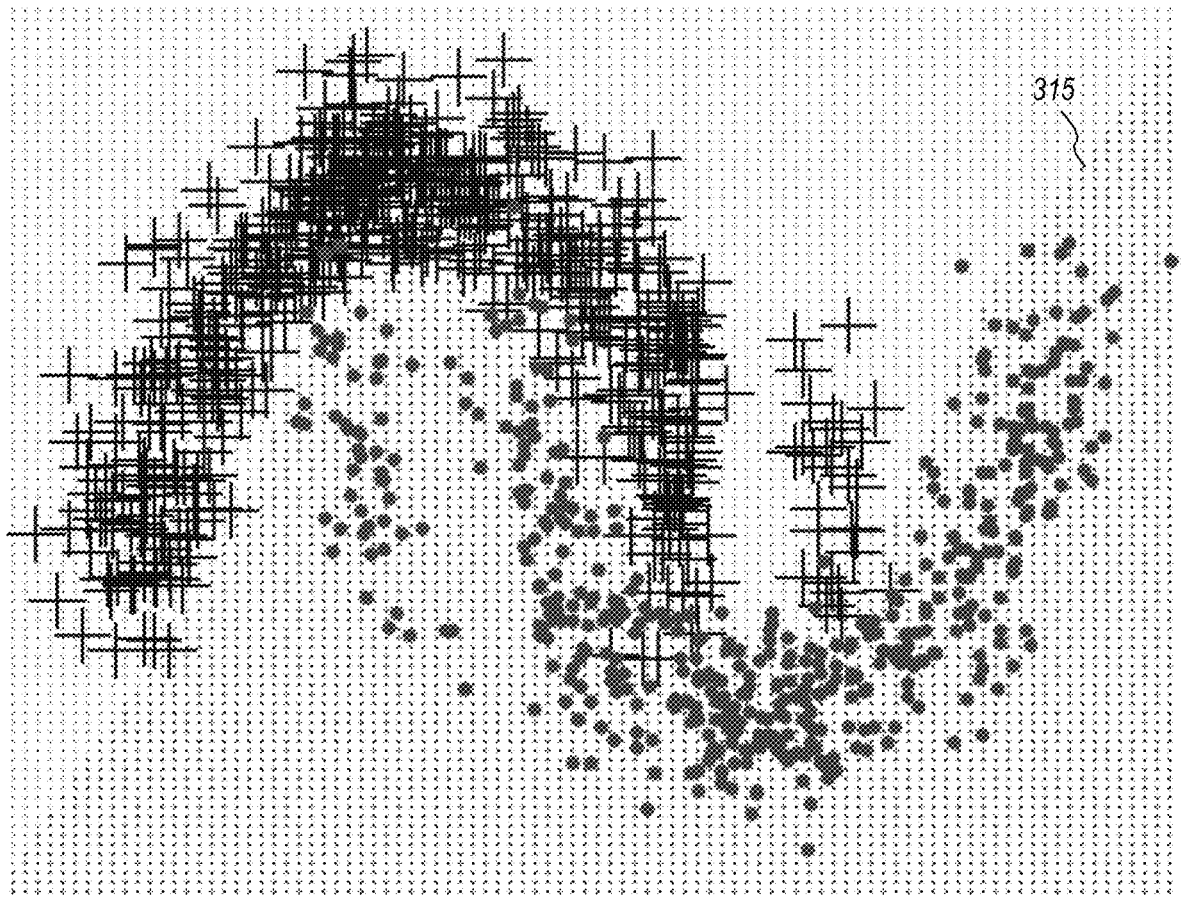
FIG. 3B graphically depicts an example of perturbed data generated using supervised adversarial generation method moving toward the decision boundary, according to embodiments of the present disclosure.

Feature Matching. Conventional training treats training data as independent and identically distributed (i.i.d) samples from a data distribution, overlooking the connections between samples. The same assumption is used when generating adversarial examples for training, with the direction for perturbing a sample purely based on the direction from the current data point to the decision boundary, regardless of other samples. While effective, it disregards the inter-relationship between different feature points, as the adversarial perturbation is computed individually for each sample, neglecting any collective distributional property. Furthermore, the supervised generation of the attacks makes the generated perturbations highly biases towards the decision boundary, as shown in FIG. 3B with reference to FIG.

Figure 3C:
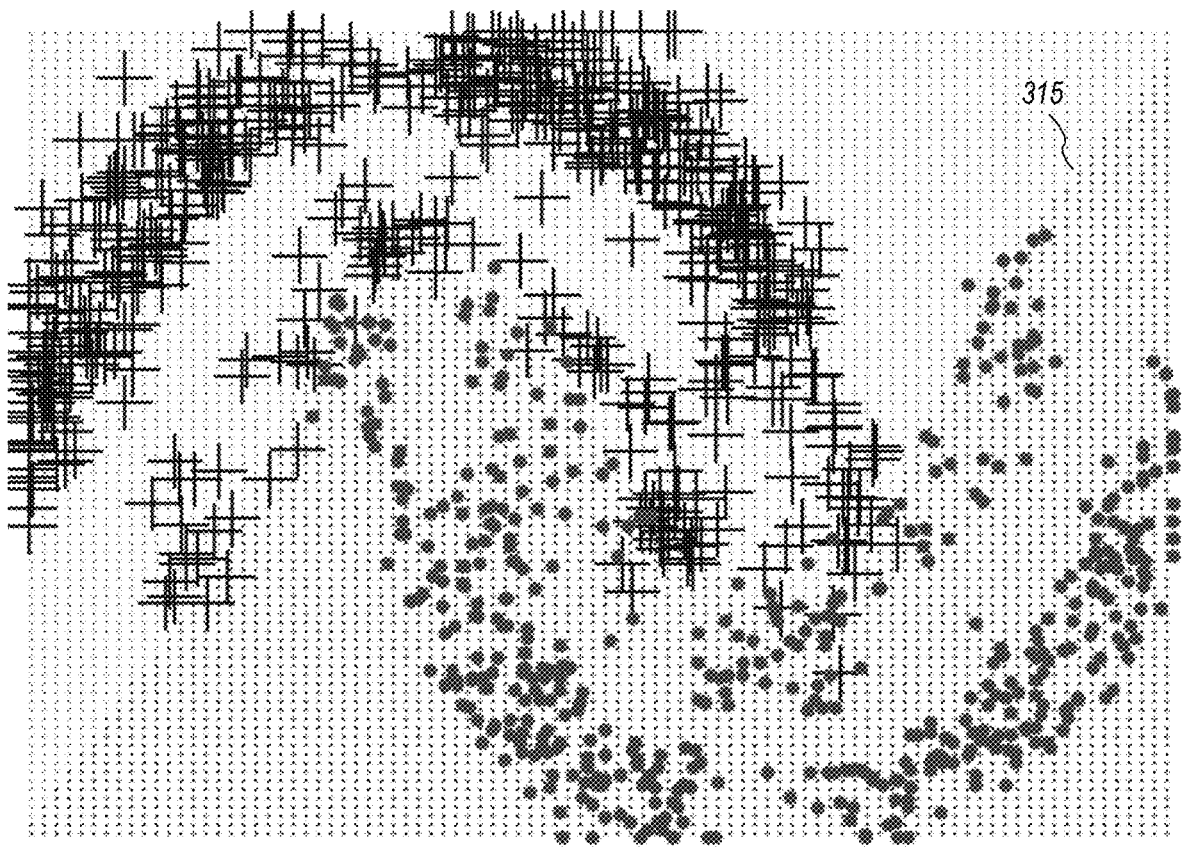
FIG. 3C graphically depicts an example of perturbed data generated using the presented feature scattering method, according to embodiments of the present disclosure.

3A. In the FIGS. 3A-3C, the overlaid boundary 315 is from the model trained on clean data. This is less desirable as it may neglect other directions that are crucial for learning robust models and may lead to label leaking due to high correlation between the perturbation and the decision boundary. In contrast, FIG. 3C graphically depicts an example of perturbed data generated using the presented feature scattering method, according to embodiments of the present disclosure.

Embodiments of leveraging inter-sample relationship for learning dates are exploited in this patent document for adversarial perturbation. The quest of local structure utilization and seamless integration with the end-to-end-training framework naturally motivates an OT-based soft matching scheme, using the OT-distance as in Equation (3). In one or more embodiments, OT between discrete distributions is considered hereafter as one of the focuses of the present patent document is applying the OT distance on image features. Specifically, consider two discrete distributions $\mu$, $\nu \in \mathbb{P}(\mathbb{X})$, which may be written as $\mu = \sum_{i=1}^{n} u_i \delta_{x_i}$ and $\nu = \sum_{i=1}^{n} v_i \delta_{x'_i}$, with $\delta_x$ the Dirac function centered on x. In one or more embodiments, the two discrete distributions may be of the same or different dimensions. The weight vectors $u = \{u_i\}_{i=1}^{n} \in \Delta_n$ and $v = \{v_i\}_{i=1}^{n} \in \Delta_n$ belong to an n-dimensional simplex, i.e., $\Sigma_i u_i = \Sigma_i v_i = 1$, as both $\mu$ and $\nu$ are probability distributions. Under such a setting, computing the OT distance as defined in Equation (3) may be equivalent to solving the following network-flow problem $$\mathcal{D}(\mu, \nu) = \min_{T \in \Pi(u,v)} \sum_{i=1}^{n} \sum_{j=1}^{n} T_{ij} \cdot c(x_i, x'_j) = \min_{T \in \Pi(u,v)} \langle T, C \rangle \quad (4)$$

Where $\Sigma(u,v) = \{T \in \mathbb{R}_+^{n \times n} | T\mathbf{1}_n = u, T^T \mathbf{1}_n = v\}$. $\mathbf{1}_n$ is an n-dimensional all-one vector $\langle \cdot, \cdot \rangle$ represents the Frobenius dot-product. T is the transport matrix. C is the transport cost matrix such that $C_{ij} = c(x_i, x'_j)$. In one or more embodiments, the transport cost may be defined as the cosine distance between image features:

$$c(x_i, x'_j) = 1 - \frac{f_\theta(x_i)^\top f_\theta(x'_j)}{\|f_\theta(x_i)\|_2 \|f_\theta(x'_j)\|_2} = 1 - \frac{f_i^\top f'_j}{\|f_i\|_2 \|f'_j\|_2} \quad (5)$$

Where $f_\theta(\cdot)$ denotes the feature extractor with parameter $\theta$. In one or more embodiments, $f_\theta(\cdot)$ is implemented as the deep neural network up to the softmax layer. The feature matching distance may be formally defined as follows.

Definition 1. (Feature Matching Distance) The feature matching distance between two set of images is defined as $\mathcal{D}(\mu, \nu)$, the OT distance between empirical distributions $\mu$ and $\nu$ for the two sets.

It shall be noted that the feature-matching distance is also a function of $\theta$ (i.e. $\mathcal{D}_\theta$) when $f_\theta(\cdot)$ is used for extracting the features in the computation of the ground distance as in Equation (5). In one or more embodiments, the notation $\mathcal{D}$ is simply used in the following when there is no danger of confusion to minimize notional clutter.

Feature Scattering. Based on the feature matching distance defined above, the presented feature scattering method may be formulated as follows:

$$\hat{\nu} = \arg \max_{\nu \in S_\mu} \mathcal{D}(\mu, \nu), \mu = \sum_{i=1}^{n} u_i \delta_{x_i}, \nu = \sum_{i=1}^{n} v_i \delta_{x'_i}. \quad (6)$$

In one or more embodiments, this may be intuitively interpreted as maximizing the feature matching distance between the original and perturbed empirical distributions with respect to the inputs subject to domain constraints $$S_\mu = \{\Sigma_i v_i \delta_{z_i} | z_i \in B(x_i, \epsilon) \cap [0, 244]^d\}, \quad (7)$$

Where $B(x, \epsilon) = \{z \mid \|z - x\|_\infty \leq \epsilon\}$ denotes the $\ell_\infty$-cube with center x and radius $\epsilon$. Formally, the notion of feature scattering may be presented as follows.

Definition 2. (Feature Scattering) Given a set of clean data $\{x_i\}$, which may be represented as an empirical distribution as $\mu = \Sigma_i u_i \delta_{x_i}$ with $u_i = 1$, the feature scattering procedure is defined as producing a perturbed empirical distribution $\nu = \Sigma_i v_i \delta_{x'_i}$ with $\Sigma_i v_i = 1$ by maximizing $\mathcal{D}(\mu, \nu)$, the feature matching distance between $\mu$ and $\nu$, subject to domain and budget constraints.

As the feature scattering is performed on a batch of samples leveraging inter-sample structure, it is more effective as adversarial attacks compared to structure-agnostic random perturbation while is less constrained than supervisedly generated perturbations which are decision boundary oriented and suffers from label leaking. Empirical comparisons are provided in Section E.

2. Embodiments of Adversarial Training with Feature Scattering

In this subsection, embodiments of adversarial training with feature scattering are disclosed.

In one or more embodiments, feature scattering for adversarial training may be leveraged with the mathematical formulation as follows:

$$\min_\theta \frac{1}{n} \sum_{i=1}^{n} \mathcal{L}_\theta(x'_i, y_i) \text{ s.t. } \nu^* \triangleq \sum_{i=1}^{n} v_i \delta_{x'_i} = \max_{\nu \in S_\mu} \mathcal{D}(\mu, \nu) \quad (8)$$

In one or more embodiments, the presented formulation deviates from conventional minimax formulation for adversarial training. More specifically, it may be regarded as an instance of the more general bilevel optimization problem. Feature scattering is effective for adversarial training scenario as there is a requirement of more data. Different from conventional supervised approach, feature scattering promotes data diversity without drastically altering the structure of the data manifold as in the conventional supervised approach, with label leaking as one manifesting phenomenon. Secondly, feature matching distance couples the samples within the batch together, therefore the generated adversarial attacks are produced collaboratively by taking inter-sample relationship into consideration. Thirdly, feature scattering implicitly induces a coupled regularization (detailed below) on model training, leveraging the inter-sample structure for joint regularization.

An overall procedure for the disclosed approach may be presented in Methodology 1 shown below.

| Methodology 1: Feature-Scattering-based Adversarial Training |
| --- |

Input: dataset S, training epochs K, batch size n, learning rate $\gamma$, budget $\epsilon$, attack iterations T for k = 1 to K do
    for random batch $\{x_i, y_i\}_{i=1}^n \sim S$ do
        initialization: $\mu = \Sigma_i\, u_i\, \delta_{x_i}$, $v = \Sigma_i\, v_i\, \delta_{x_i'}$, $x_i' \sim B(x_i, \epsilon)$
        feature scattering (maximizing feature matching distance $\mathcal{D}$ with respect to $v$):
        for t = 1 to T do
            $\cdot\, x_i' \leftarrow \mathcal{P}_{S_x}(x_i' + \epsilon \cdot \mathrm{sign}(\nabla_{x_i'}\mathcal{D}(\mu, v)))$    $\forall i = 1, \ldots, n,$    $v = \Sigma_i\, v_i\, \delta_{x_i'}$
        end for
        adversarial training (updating model parameters):

$\cdot\, \theta \leftarrow \theta - \gamma \cdot \dfrac{1}{n}\sum_{i=1}^{n} \nabla_\theta \mathcal{L}(x_i', y_i; \theta)$ end for
end for
Output: model parameter $\theta$.

Figure 4:
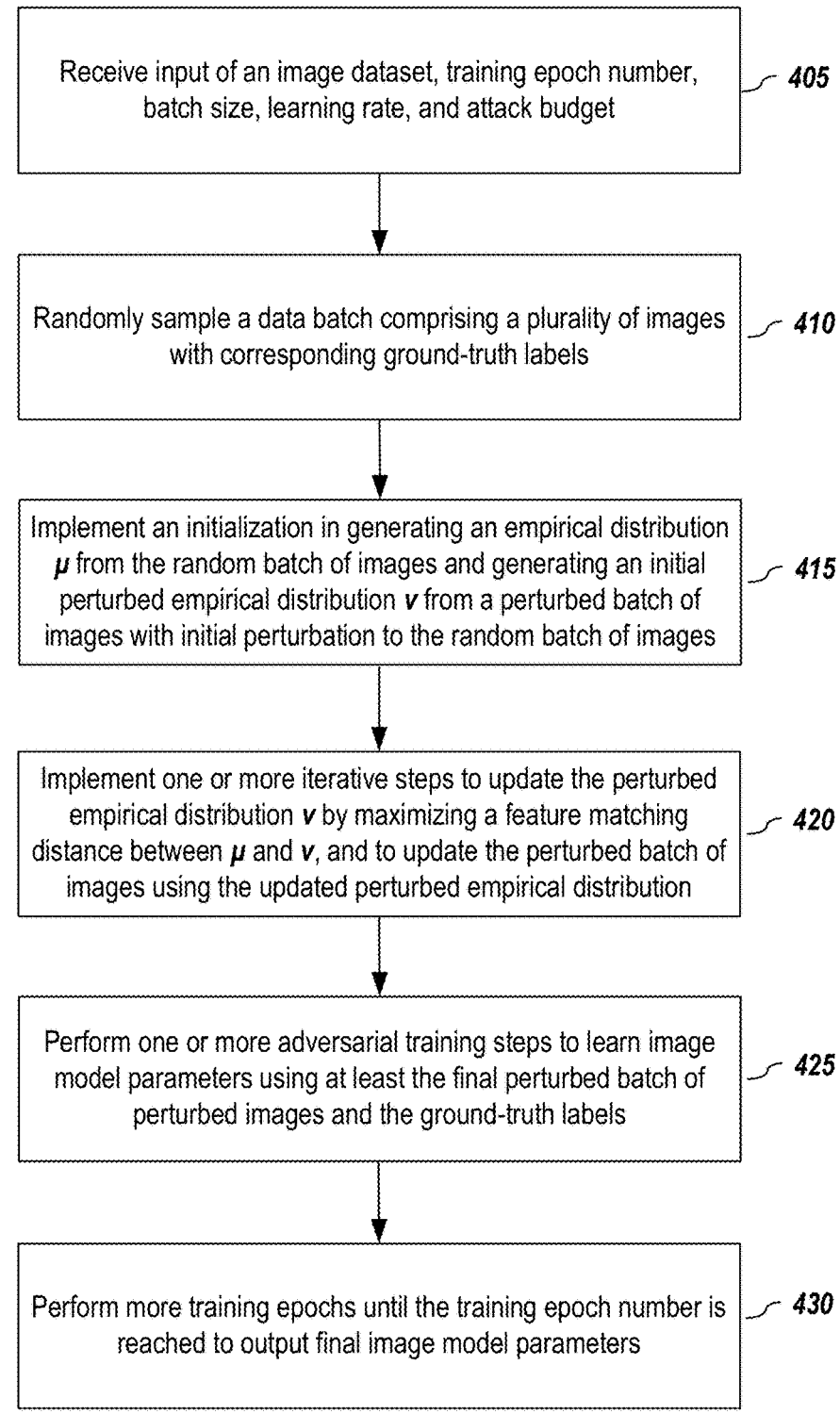
FIG. 4 depicts a methodology for feature-scattering-based adversarial training, according to embodiments of the present disclosure.

FIG. 4 depicts a methodology for feature-scattering-based adversarial training, according to embodiments of the present disclosure. An image dataset S, training epochs K, batch size n, attack budget $\epsilon$, and attack iterations T are received (405) as input. For each training epoch, a random batch of images is selected (410) from the image dataset S. The random batch comprises a plurality of images $x_i$ with each image associated with corresponding ground-truth labels $y_i$. An initialization is implemented (415) in generating an empirical distribution $\mu$ from the random batch of images and generating a perturbed empirical distribution $v$ from a perturbed batch of images x; with initial perturbation to the random batch of images. In one or more embodiments, the empirical distribution $\mu$ is an n-dimensional simplex vector. The initial perturbation to the random batch of images is done by applying random perturbations within the $\ell_\infty$-cube $B(x, \epsilon)$ with a center $x_i$ and a radius $\epsilon$. The perturbed empirical distribution $v$ is then initially obtained based on the Dirac function centered on each initially perturbed image $x'_i$ and a distribution of weight vectors $v_i$, which may be a uniform distribution initially in one or more embodiments.

One or more iterative steps are implemented (420) to update the perturbed empirical distribution $v$, from the initially obtained perturbed empirical distribution, by maximizing a feature matching distance $\mathcal{D}(\mu, v)$ between $\mu$ and $v$, and update the perturbed batch of images $x'_i$ using the updated perturbed empirical distribution $v$. In one or more embodiments, feature matching distance $\mathcal{D}(\mu, v)$ is the OT distance between empirical distributions $\mu$ and $v$. In one or more embodiments, gradients $\nabla_{x_i'}\mathcal{D}(\mu, v))$ of $\mathcal{D}(\mu, v)$ with respect to the perturbed batch of images $x'_i$ are calculated and used for updating the perturbed batch of images. After obtaining the gradients $\nabla_{x_i'}\mathcal{D}(\mu, v)$, the sign operator sign ($\cdot$) is applied to the gradient, and then the sign applied gradient is used to take an ascent step scaled by a steps size of the budget $\epsilon$ from the perturbed batch of images xti, which is then projected to a feasible region $S_x$ to update the perturbed batch of images. The above iterative processes may be repeated for predetermined attack iterations T to output a final perturbed batch of perturbed images. One or more adversarial training steps are then performed (425) to learn image model parameters $\theta$ using at least the final perturbed batch of perturbed images and the ground-truth labels. More training epochs may be performed (430) until a predetermined training epoch number K is reached and the final model parameters $\theta$ are output. In each training epoch, a random batch is sampled from the dataset and the aforementioned training processed repeated for each training epoch. In one or more embodiments, the random batch is sampled without replacement, such that any image in the dataset has only one chance to be selected.

D. Discussion

Manifold-based Defense. Some proposed to defend by projecting the perturbed image onto a proper manifold. Some used a similar idea of manifold projection but approximated this step with a nearest neighbor search against a web-scale database. Differently, in embodiments of the present patent document, the manifold is leveraged in the form of inter-sample relationship for the generation of the perturbations, which induces an implicit regularization of the model when used in the adversarial training framework. While defense may be achieved by shrinking the perturbed inputs towards the manifold, the manifold in embodiments of the presented patent disclosure is expand using feature scattering to generate perturbed inputs for adversarial training.

Inter-sample Regularization. Some generated training examples by linear interpolation between pairs of natural examples, thus introducing a linear inductive bias in the vicinity of training samples. Therefore, the model is expected to reduce the amount of undesirable oscillations for off-manifold samples. Some proposed Adversarial logit pairing to augment the original training loss with a "pairing" loss, which measures the difference between the logits of clean and adversarial images. The idea is to suppress spurious logits responses using the natural logits as a reference. Similarly, some proposed a regularization method, virtual adversarial training, using a regularization term based on the KL divergence of the prediction probability of original and adversarially perturbed images. In one or more embodiments of the presented model, the inter-sample relationship is leveraged for generating the adversarial perturbations, which induces an implicit regularization term in the objective function that is coupled over all input samples.

Wasserstein GAN and OT-GAN. Generative Adversarial Networks (GAN) is a family of techniques that learn to capture the data distribution implicitly by generating samples directly. It originally suffers from the issues of instability of training and mode collapsing. OT-related distances have been used for overcoming the difficulties encountered in the original GAN training. This technique has been further extended to generating discrete data such as texts. Different from GANs, which maximizes discrimination criteria with respect to parameters of a discriminator for better capturing data distribution, in embodiments of the present patent document, a feature matching distance is maximized with respect to perturbed inputs for generating proper training data to improve model robustness.

E. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

Baselines and Implementation Details. In one or more experimental settings, the implementation for the presented feature-scattering-based adversarial training is based on PyTorch. Extensive experiments were conducted across several benchmark datasets including CIFAR10 and CIFAR100 (A. Krizhevsky, Learning multiple layers of features from tiny images, Technical report, 2009). In one or more experimental settings, Wide ResNet WRN-28-10 (S. Zagoruyko et al., Wide residual networks, In British Machine Vision Conference, 2016) was used as the network structure following Madry et al. (Madry) (Towards deep learning models resistant to adversarial attacks. In International Conference on Learning Representations, 2018). Performance of presented method embodiments was compare with a number of baseline methods, including: i) the model trained with standard approach using clean images (Standard) (A. Krizhevsky, Learning multiple layers of features from tiny images, Technical report, 2009), ii) PGD-based approach from Madry, iii) another recent method performing adversarial training with both image and label adversarial perturbations (Bilateral) (J. Wang et al., Bilateral adversarial training: Towards fast training of more robust models against adversarial attacks, CoRR, abs/1811.10716, 2018). For training, the initial learning rate y was 0.1 for CIFAR. In one or more experimental settings, the number of epochs for the Standard and Madry methods was set as 100 with transition epochs as {60, 90} as it was empirically observed the performance of the trained model stabilized before 100 epochs. The training scheduling of 200 epochs similar to Bilateral with the same transition epochs used as it was empirically observed it helps with the model performance, possibly due to the increased variations of data via feature scattering. In one or more experimental settings, standard data augmentation, including random crops with 4 pixels of padding and random horizontal flips during training, was performed. The perturbation budget of $\in=8$ is used in training following Madry. In one or more experimental settings, label smoothing of 0.5, attack iteration of 1 and Sinkhorn algorithm with regularization of 0.01 were used. For testing, model robustness was evaluated by approximately computing an upper bound of robustness on the test set, by measuring the accuracy of the model under different adversarial attacks, including white-box FGSM, PGD (Madry), CW (CW-loss within the PGD framework) (N. Carlini and D. Wagner, Towards Evaluating the Robustness of Neural Networks, In IEEE Symposium on Security and Privacy, 2017) attacks and variants of black-box attacks.

1. Visual Classification Performance Under White-box Attacks

CIFAR10. One or more experiments were conducted on CIFAR10, a popular dataset that is widely use in adversarial training literature with 10 classes, 5K training images per class and 10K test images. Accuracy on the original test images (Clean) and under PGD and CW attack with T iterations (PGD T and CW T) was reported. The evaluation results were summarized in Table 1. It was observed Standard model failed drastically under different white-box attacks. Madry method improved the model robustness significantly over the Standard model. Under the standard PGD20 attack, it achieved 44.9% accuracy. The Bilateral approach further boosted the performance to 57.5%. The presented approach outperformed both methods by a large margin, improving over Madry by 25.6%, and was 13.0% better than Bilateral, achieving 70.5% accuracy under the standard 20 steps PGD attack. Similar pattern has been observed for CW metric.

Figure 5A:
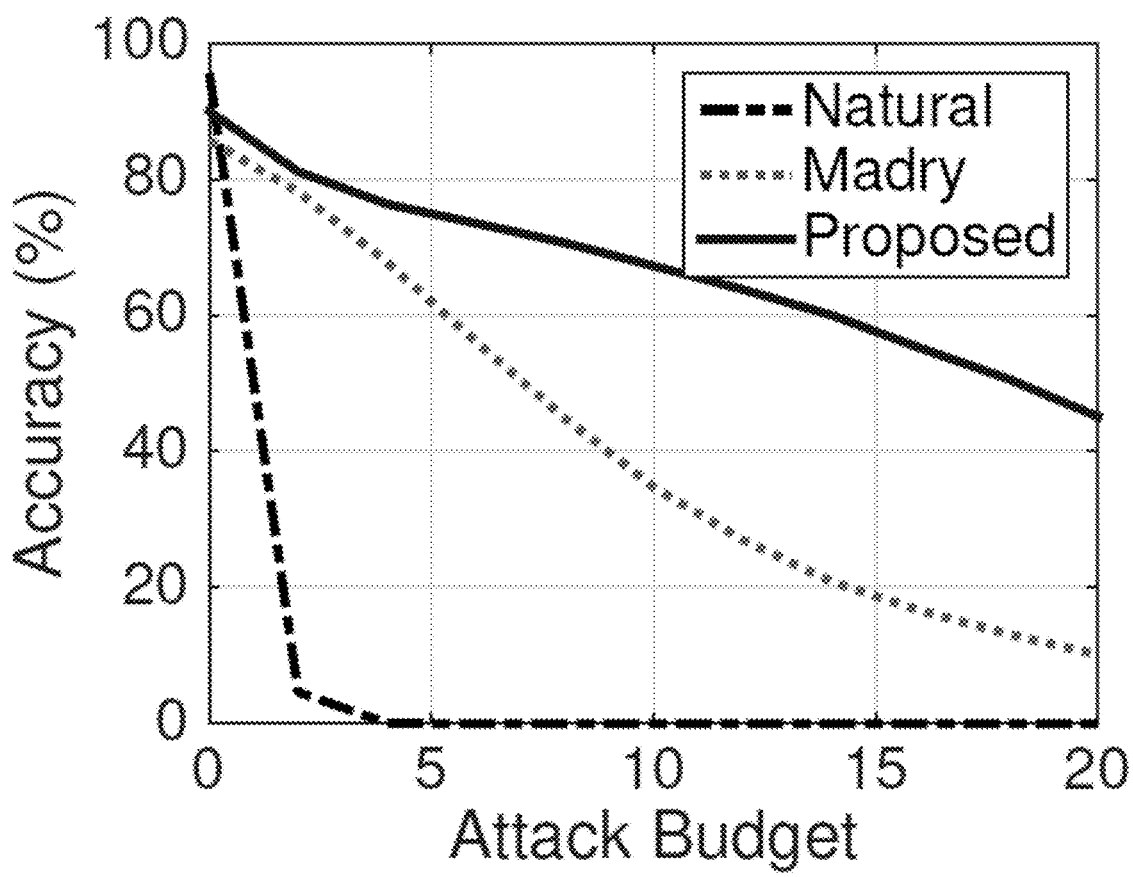
FIG. 5A graphically depicts model performances under projected gradient descent (PGD) attack with different attack budgets, according to embodiments of the present disclosure.
Figure 5B:
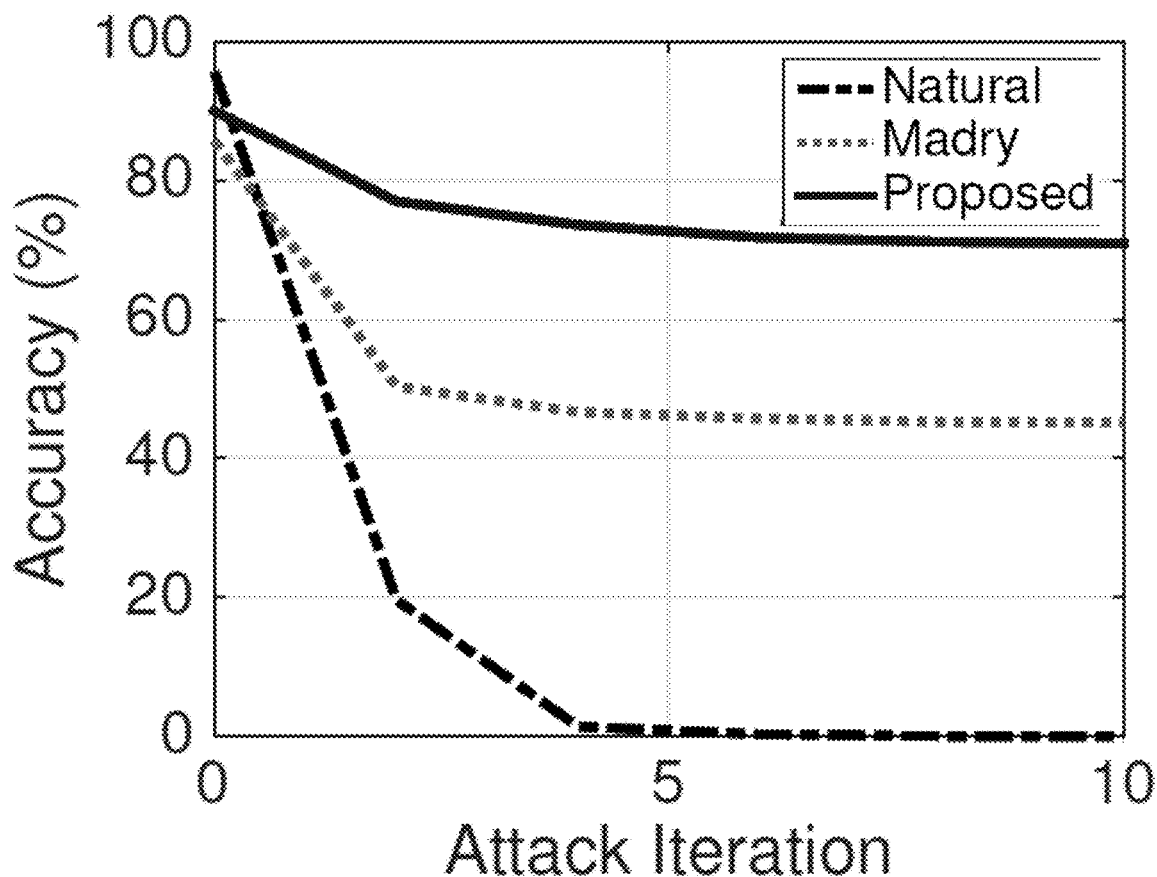
FIG. 5B graphically depicts model performances under PGD attack with different attack iterations with the range of attack iterations from 0 to 5, according to embodiments of the present disclosure.
Figure 5C:
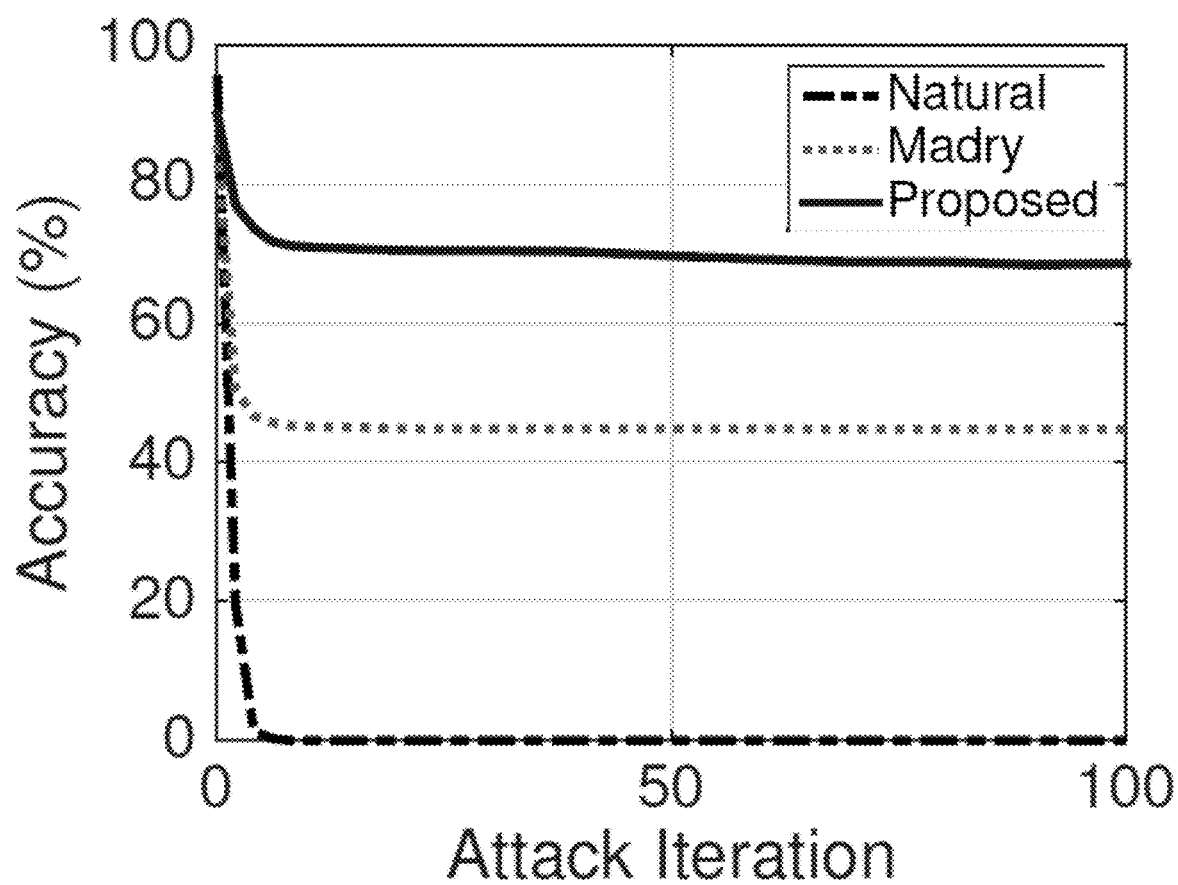
FIG. 5C graphically depicts model performances under PGD attack with different attack iterations with the range of attack iterations from 0 to 100, according to embodiments of the present disclosure.

In one or more experiments, model robustness against PGD attacker under different attack budgets were further evaluated with a fixed attack step of 20, with the results shown in FIG. 5A. It was observed that the performance of Standard model dropped quickly as the attack budget increases. The Madry model improved the model robustness significantly across a wide range of attack budgets. The Presented approach further boosted the performance over the Madry model by a large margin under different attack budgets. Experiments were also conducted using PGD attacker with different attack iterations with a fixed attack budget of 8, with the results shown in FIG. 5B and FIG. 5C, and also Table 1. It was observed that both Madry and Presented may maintain a fairly stable performance when the number of attack iterations is increased. It shall be noted that the presented approach consistently outperforms Madry model across a wide range of attack iterations. From Table 1, it was also observed that the Presented approach also outperforms Bilateral under all variants of PGD and CW attacks. In one or more experimental settings, a PGD/CW attackers with $\in=8$ and attack step 20 and 100 in the sequel were used as part of the threat models.

TABLE 1

Accuracy comparison of the Presented approach with Standard, Madry and Bilateral methods on CIFAR10 under different threat models

| | | Accuracy under White-box Attack ($\epsilon = 8$) | | | | | | | | |
|---|---|---|---|---|---|---|---|---|---|---|
| Models | Clean | FGSM | PGD10 | PGD20 | PGD40 | PGD100 | CW10 | CW20 | CW40 | CW100 |
| Standard | 95.6 | 36.9 | 0.0 | 0.0 | 0.00 | 0.0 | 0.0 | 0.0 | 0.0 | 0.0 |
| Madry | 85.7 | 54.9 | 45.1 | 44.9 | 44.8 | 44.8 | 45.9 | 45.7 | 45.6 | 45.4 |
| Bilateral | 91.2 | 70.7 | — | 57.5 | — | 55.2 | — | 56.2 | — | 53.8 |
| Presented | 90.0 | 78.4 | 70.9 | 70.5 | 70.3 | 68.6 | 62.6 | 62.4 | 62.1 | 60.6 |

TABLE 2

Accuracy comparison on CIFAR100

| | | White-box Attack ($\epsilon = 8$) | | | | |
|---|---|---|---|---|---|---|
| Models | Clean | FGSM | PGD20 | PGD100 | CW20 | CW100 |
| Standard | 79.0 | 10.0 | 0.0 | 0.0 | 0.0 | 0.0 |
| Madry | 59.9 | 28.5 | 22.6 | 22.3 | 23.2 | 23.0 |
| Bilateral | 68.2 | 60.8 | 26.7 | 25.3 | — | 22.1 |
| Presented | 73.9 | 61.0 | 47.2 | 46.2 | 34.6 | 30.6 |

CIFAR100. Experiments were also conducted on CIFAR100 dataset, with 100 classes, 50K training and 10K test images. It shall be noted that this dataset is more challenging than CIFAR10 as the number of training images per class is ten times smaller than that of CIFAR10. As shown by the results in Table 2, the presented approach outperforms all baseline methods significantly, which is about 20% better than Madry and Bilateral under PGD attack and about 10% better under CW attack. The superior performance of the presented approach on this data set further demonstrates the importance of leveraging inter-sample structure for learning.

2. Ablation Studies

In this subsection, impacts of algorithmic components were investigated.

The Importance of Feature Scattering. The effectiveness of feature scattering was empirically verified, by comparing the performances of models trained using different perturbation schemes: i) Random: a natural baseline approach that randomly perturb each sample within the epsilon neighborhood; ii) Supervised: perturbation generated using ground-truth label in a supervised fashion; iii) FeaScatter: perturbation generated using the proposed feature scattering method. All other hyper-parameters are kept exactly the same other than the perturbation scheme used. The results are summarized in Table 3. It is evident that the disclosed feature scattering (FeaScatter) approach outperforms both Random and Supervised methods, demonstrating its effectiveness. Furthermore, as it is the major component that is difference from the conventional adversarial training pipeline, this result suggests that feature scattering is the main contributor to the improved adversarial robustness.

TABLE 3

Importance of feature-scattering

| | | White-box Attack ($\epsilon = 8$) | | | | |
|---|---|---|---|---|---|---|
| Perturb | Clean | FGSM | PGD20 | PGD100 | CW20 | CW100 |
| Random | 95.3 | 75.7 | 29.9 | 18.3 | 34.7 | 26.2 |
| Supervised | 86.9 | 64.4 | 56.0 | 54.5 | 51.2 | 50.3 |
| FeaScatter | 90.0 | 78.4 | 70.5 | 68.6 | 62.4 | 60.6 |

TABLE 4

Impacts of different matching schemes

| | | White-box Attack ($\epsilon = 8$) | | | | |
|---|---|---|---|---|---|---|
| Match | Clean | FGSM | PGD20 | PGD100 | CW20 | CW100 |
| Uniform | 90.0 | 71.0 | 57.1 | 54.7 | 53.2 | 51.4 |
| Identity | 87.4 | 66.3 | 57.5 | 56.0 | 52.4 | 50.6 |
| OT | 90.0 | 78.4 | 70.5 | 68.6 | 62.4 | 60.6 |

The Role of Matching. The role of matching schemes within the feature scattering component were further investigated by comparing several different schemes: i) Uniform matching, which matches each clean sample uniformly with all perturbed samples in the batch; ii) Identity matching, which matches each clean sample to its perturbed sample only; iii) OT-matching: the proposed approach that assigns soft matches between the clean samples and perturbed samples according to the optimization criteria. The results are summarized in Table 5. It is observed all variants of matching schemes lead to performances that are on par or better than state-of-the-art methods, implying that the presented framework is effective in general. Notably, OT-matching leads to the best results, suggesting the importance of the proper matching for feature scattering.

The Impact of OT-Solvers. Exact minimization of Equation (4) over T was intractable in general. In one or more experiments, two practical solvers, the Sinkhorn algorithm (M. Cuturi. Sinkhorn distances: Lightspeed computation of optimal transport, In Advances in Neural Information Processing Systems, 2013) and the Inexact Proximal point method for Optimal Transport (IPOT) algorithm (Y. Xie, et al., A Fast Proximal Point Method For Wasserstein Distance, arXiv:1802.04307, 2018) were compared. The results were summarized in Table 5. It was shown that different instantiations of the proposed approach with different OT-solvers lead to comparable performances, implying that the proposed approach is effective in general regardless of the choice of OT-solvers.

TABLE 5

Impacts of OT-solvers. Embodiments of the presented approach perform well with different OT-solvers

| | CIFAR10 | | | | | | CIFAR100 | | | | | |
|---|---|---|---|---|---|---|---|---|---|---|---|---|
| OT-solver | Clean | FGSM | PGD20 | PGD100 | CW20 | CW100 | Clean | FGSM | PGD20 | PGD100 | CW20 | CW100 |
| Sinkhorn | 90.0 | 78.4 | 70.5 | 68.6 | 62.4 | 60.6 | 73.9 | 61.0 | 47.2 | 46.2 | 34.6 | 30.6 |
| IPOT | 89.9 | 77.9 | 69.9 | 67.3 | 59.6 | 56.9 | 74.2 | 67.3 | 47.5 | 46.3 | 32.0 | 29.3 |

3. Performance under Black-Box Attack

To further verify if a degenerate minimum is obtained, robustness of the model trained with the proposed approach was evaluated with respect to black-box attacks (B-Attack). Two different models are used for generating test time attacks: i) Undefended: undefended model trained using Standard approach, ii) Siamese: a robust model from another training session using the proposed approach. As demonstrated by the results in table 5 below, the model trained with the presented approach is robust against different types of black-box attacks, verifying that a non-degenerate solution is learned.

TABLE 5

Performance of different models under Black-box Attack.

| B-Attack | PGD20 | PGD100 | CW20 | CW100 |
|---|---|---|---|---|
| Undefended | 89.0 | 67.8 | 62.1 | 59.7 |
| Siamese | 81.3 | 67.6 | 62.2 | 59.7 |

F. Some Conclusions

Disclosed herein are embodiments of a feature scattering-based adversarial training method. Embodiments of the presented approach distinguish from others by using an unsupervised feature-scattering approach for generating adversarial training images, which leverages the inter-sample relationship for collaborative perturbation generation. In one or more embodiments, a coupled regularization term is induced from feature scattering for adversarial training. Extensive experiments on benchmark datasets demonstrate the effectiveness of the presented approach.

G. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
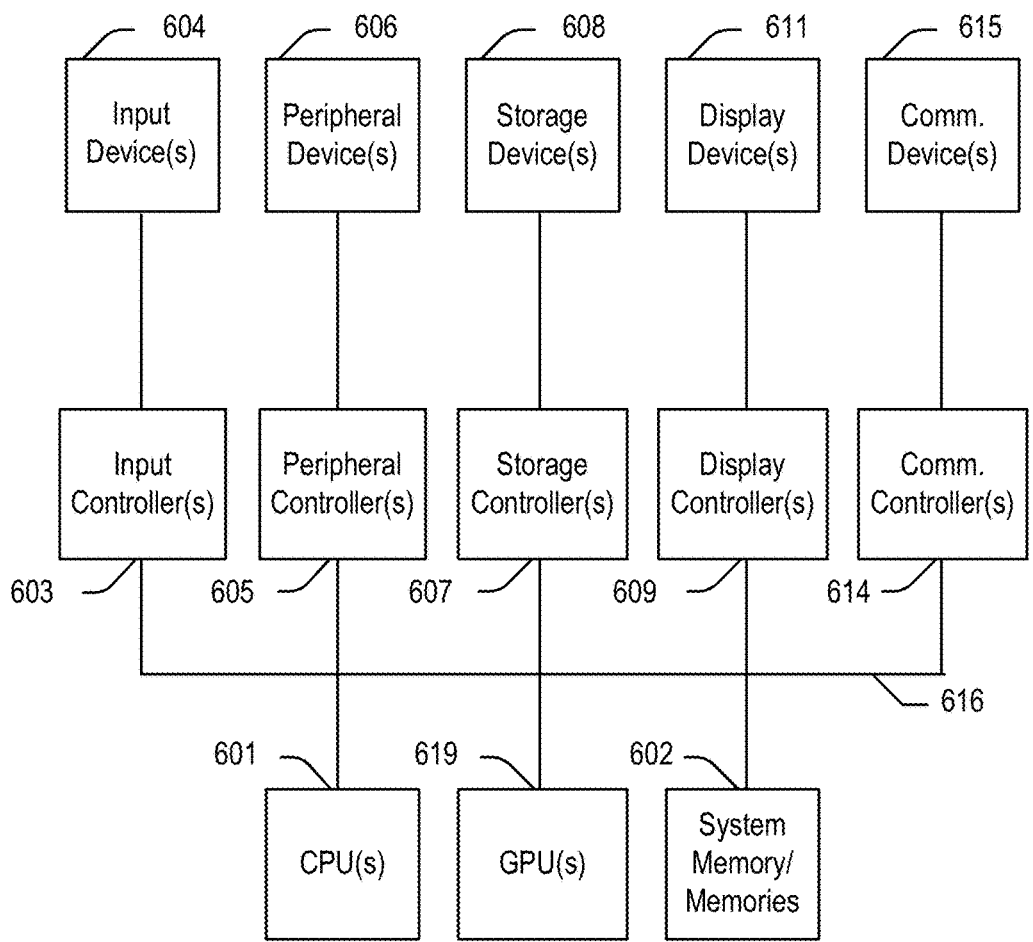
FIG. 6 depicts a simplified block diagram of a computing device/information handling system, in accordance with embodiments of the present disclosure.

FIG. 6 depicts a simplified block diagram of a computing device/information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present invention. Storage device(s) 608 may also be used to store processed data or data to be processed in accordance with the invention. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implement method for generating adversarial training data for training a parameterized model comprising:
   generating an initial set of perturbed training data from a set of clean training data;
   using the parameterized model, extracting features from the set of clean training data and the initial set of perturbed training data;
   calculating a transport cost matrix between features extracted from the set of clean training data and features extracted from the initial set of perturbed training data;
   determining a transport matrix based upon the transport cost matrix representing a matching between features in the set of clean training data and the initial set of perturbed training data;
   determining a product using the transport cost matrix and the transport matrix to represent feature matching distance between the set of clean training data and the initial set of perturbed training data; and
   obtaining a set of feature-scattering-based training data based on at least the determined feature matching distance.

2. The computer-implement method of claim 1 further comprising:
   extracting features from the set of feature-scattering-based training data using the parameterized model;
   for each data sample corresponding to a data sample from the initial set of perturbed training data, determining class label probabilities based upon the extracted features from the set of feature-scattering-based training data;
   determining a loss based upon the determined class label probabilities and a ground truth label associated with each of the data samples; and
   updating model parameters of the parameterized model using the determined loss.

3. The computer-implement method of claim 1 wherein the parameterized model is an image classification model, the clean training data are clean images, the perturbed training data are perturbed images.

4. The computer-implement method of claim 3 wherein the initial set of perturbed images are generated by adding random noise within a predetermined image perturbation budget to the clean images.

5. The computer-implement method of claim 3 wherein the transport cost matrix comprises a plurality of elements, with each element representing a distance between features of one clean image and one perturbed image.

6. The computer-implement method of claim 1 wherein the determined feature matching distance corresponds to a minimum feature matching distance between an empirical distribution from the set of clean training data and a perturbed empirical distribution from the initial set of perturbed training data.

7. The computer-implemented method of claim 1 wherein obtaining the set of feature-scattering-based training data based on at least the determined feature matching distance comprising:
   obtaining a gradient of the determined feature matching distance;
   applying a sign operator to the gradient;
   taking an ascent step scaled by a steps size from the initial set of perturbed training data; and
   projecting the initial set of perturbed training data with the ascent step to a feasible region to obtain the set of feature-scattering-based training data.

8. The computer-implement method of claim 7 wherein the gradient is with respect to the initial set of perturbed training data.

9. The computer-implement method of claim 7 wherein the step size is a predetermined perturbation budget.

10. A non-transitory computer-readable medium or media comprising one or more sequences of instructions which, when executed by one or more processors, causes the steps for generating adversarial training data for training a parameterized model to be performed comprising:
   generating an initial set of perturbed training data from a set of clean training data;
   extracting features from the set of clean training data and the initial set of perturbed training data;
   calculating a transport cost matrix between features extracted from the set of clean training data and features extracted from the initial set of perturbed training data;
   determining a transport matrix based upon the transport cost matrix representing a matching between features in the set of clean training data and the initial set of perturbed training data;
   determining a product using the transport cost matrix and the transport matrix to represent feature matching distance between the set of clean training data and the initial set of perturbed training data; and
   obtaining a set of feature-scattering-based training data based on at least the determined feature matching distance.

11. The non-transitory computer-readable medium or media of claim 10 wherein the one or more sequences of instructions further comprise:
   extracting features from the set of feature-scattering-based training data using the parameterized model;
   for each data sample corresponding to a data sample from the initial set of perturbed training data, determining class label probabilities based upon the extracted features from the set of feature-scattering-based training data;
   determining a loss based upon the determined class label probabilities and a ground truth label associated with each of the data samples; and
   updating model parameters of the parameterized model using the determined loss.

12. The non-transitory computer-readable medium or media of claim 10 wherein obtaining the set of feature-scattering-based training data based on at least the determined feature matching distance comprising:
   obtaining a gradient of the determined feature matching distance;
   applying a sign operator to the gradient;
   taking an ascent step scaled by a steps size of a predetermined perturbation budget from the initial set of perturbed training data; and
   projecting the initial set of perturbed training data with the ascent step to a feasible region to obtain the set of feature-scattering-based training data.

13. The non-transitory computer-readable medium or media of claim 12 wherein the gradient of the determined feature matching distance is respect to the initial set of perturbed training data.

14. The non-transitory computer-readable medium or media of claim 12 wherein the clean training data are clean images, the perturbed training data are perturbed images.

15. The non-transitory computer-readable medium or media of claim 14 wherein the transport cost matrix comprises a plurality of elements, with each element representing a distance between features of one clean image and one perturbed image.

16. A system comprising:
   one or more processors; and
   a non-transitory computer-readable medium or media comprising one or more sets of instructions which, when executed by at least one of the one or more processors, causes steps to be performed comprising:
      generating an initial set of perturbed training data from a set of clean training data;
      using the parameterized model, extracting features from the set of clean training data and the initial set of perturbed training data;
      calculating a transport cost matrix between features extracted from the set of clean training data and features extracted from the initial set of perturbed training data;
      determining a transport matrix based upon the transport cost matrix representing a matching between features in the set of clean training data and the initial set of perturbed training data;
      determining a product using the transport cost matrix and the transport matrix; and
      obtaining a set of feature-scattering-based training data based on at least the determined feature matching distance.

17. The system of claim 16 wherein the non-transitory computer-readable medium or media further comprises one or more sequences of instructions which, when executed by at least one of the one or more processors, causes steps to be performed comprising:
   extracting features from the set of feature-scattering-based training data using the parameterized model;
   for each data sample corresponding to a data sample from the initial set of perturbed training data, determining class label probabilities based upon the extracted features from the set of feature-scattering-based training data;
   determining a loss based upon the determined class label probabilities and a ground truth label associated with each of the data samples; and
   updating model parameters of the parameterized model using the determined loss.

18. The system of claim 16 wherein:
   the parameterized model is an image classification model, the clean training data are clean images, the perturbed training data are perturbed images; and
   the transport cost matrix comprises a plurality of elements, with each element representing a distance between features of one clean image and one perturbed image.

19. The system of claim 16 wherein the determined feature matching distance corresponds to a minimum feature matching distance between a distribution from the set of clean training data and a perturbed distribution from the initial set of perturbed training data.

20. The system of claim 16 wherein obtaining the set of feature-scattering-based training data based on at least the determined feature matching distance comprising:
   obtaining a gradient of the determined feature matching distance;
   applying a sign operator to the gradient;
   taking an ascent step scaled by a steps size from the initial set of perturbed training data; and
   projecting the initial set of perturbed training data with the ascent step to a feasible region to obtain the set of feature-scattering-based training data.

* * * * *